United States Patent
Giffen et al.

(10) Patent No.: US 11,316,343 B2
(45) Date of Patent: Apr. 26, 2022

(54) INTERACTIVE USER CONTROL OF POWER UTILIZATION

(71) Applicant: Dell Products, L.P., Round Rock, TX (US)

(72) Inventors: Jonathan C. Giffen, Austin, TX (US); Keith Lambright, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 32 days.

(21) Appl. No.: 16/901,904

(22) Filed: Jun. 15, 2020

(65) Prior Publication Data

US 2021/0391716 A1    Dec. 16, 2021

(51) Int. Cl.
| | |
|---|---|
| *G06F 1/00* | (2006.01) |
| *H02J 1/10* | (2006.01) |
| *G06F 1/3234* | (2019.01) |
| *G06F 1/18* | (2006.01) |
| *G06F 1/3203* | (2019.01) |

(52) U.S. Cl.
CPC .............. *H02J 1/106* (2020.01); *G06F 1/189* (2013.01); *G06F 1/325* (2013.01); *G06F 1/3203* (2013.01)

(58) Field of Classification Search
CPC ........... H02J 1/106; G06F 1/189; G06F 1/325
USPC ......................................................... 713/300
See application file for complete search history.

(56) References Cited

U.S. PATENT DOCUMENTS

| | | | | |
|---|---|---|---|---|
| 6,498,460 B1* | 12/2002 | Atkinson | ................ | G06F 1/324 320/135 |
| 6,963,986 B1* | 11/2005 | Briggs | .................. | G06F 1/3203 713/320 |
| 2004/0021371 A1* | 2/2004 | Jouper | .................. | H02J 7/0031 307/29 |
| 2009/0100275 A1* | 4/2009 | Chang | ..................... | G06F 1/266 713/300 |
| 2009/0113221 A1* | 4/2009 | Hoile | ...................... | G06F 1/189 713/310 |
| 2011/0060932 A1* | 3/2011 | Conroy | ..................... | G06F 1/30 713/340 |
| 2012/0096299 A1* | 4/2012 | Kim | ...................... | G06F 1/3209 713/340 |
| 2014/0164805 A1* | 6/2014 | Hasui | ...................... | G06F 1/266 713/323 |
| 2014/0354870 A1* | 12/2014 | Horie | ...................... | G06F 1/329 348/333.02 |

(Continued)

*Primary Examiner* — Volvick Derose
(74) *Attorney, Agent, or Firm* — Fogarty LLP (57) ABSTRACT

Embodiments provide capabilities by which a user provides interactive inputs for allocating use of the available power budget of an IHS (Information Handling System) when a conflict in the power budget is detected. The power demand of the IHS processor(s) is monitored. When a USB device is coupled to the IHS, a power output to the USB device is enabled within the available power budget. Upon detecting an increase in the power demand of the processor, the power budget may be exceeded. The user is then prompted to specify whether to prioritize use of the power budget for performance of the IHS or for charging the USB device. Based on inputs provided by the user, the processor may be throttled or the power output to the USB device may be reduced. The user is thus provided a capability for resolving individual power budget conflicts based on the user's current preferences.

18 Claims, 4 Drawing Sheets

(56) References Cited

U.S. PATENT DOCUMENTS

| | | | | |
|---|---|---|---|---|
| 2015/0340898 A1* | 11/2015 | Schwartz | ............... | H02J 7/342 |
| | | | | 320/103 |
| 2016/0034012 A1* | 2/2016 | Sahu | ................... | G06F 1/3287 |
| | | | | 713/320 |
| 2018/0284866 A1* | 10/2018 | Sakai | ................. | H04N 1/00885 |
| 2018/0287491 A1* | 10/2018 | Muto | ................... | H02M 3/156 |
| 2019/0138072 A1* | 5/2019 | Kuroi | ..................... | G06F 1/305 |
| 2020/0012326 A1* | 1/2020 | Steele | .................... | G06F 1/266 |

* cited by examiner

INTERACTIVE USER CONTROL OF POWER UTILIZATION

FIELD

This disclosure relates generally to Information Handling Systems (IHSs), and more specifically, to powering IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS includes a variety of internal components that may consume variable amounts of power during operation of the IHS. For instance, the main processor of an IHS may consume considerable amounts of power and will typically consume considerably more power as the processor is operated at faster speeds and as the processor is increasingly loaded with additional computational tasks. Power may be provided to an IHS using a power supply or adapter that draws AC power from an electrical outlet and converts the drawn power to DC. The supply of DC power may be used in powering the operations of the IHS or, in scenarios where the IHS is portable, in charging its internal batteries.

An IHS may include one or more externally accessible USB (Universal Serial Bus) ports by which external devices may be coupled to the IHS. Via such USB couplings, data and power may be transferred bidirectionally between an IHS and an external USB device. Utilizing these capabilities, an IHS may route a portion of its DC power supply for transfer to a coupled USB device. The power that is provided to a USB device may then be used in powering the operations of the USB device and/or charging its internal batteries.

SUMMARY

In various embodiments, methods are provided for powering an Information Handling System (IHS). The methods may include: powering a processor of the IHS using a power budget available to the IHS; identifying a USB device coupled to the IHS; receiving a request for a first power output by the IHS to the USB device; determining that providing the first power output to the USB device exceeds the power budget available to the IHS; prompting a user of the IHS to specify whether to prioritize use of the power budget for performance of the IHS or for charging the USB device; when the user specifies prioritizing charging the USB device, throttling the processor of the IHS; and when the user specifies prioritizing performance of the IHS, providing a second power output to the USB device, wherein the second power output is less than the first power output.

In additional method embodiments, the throttling of the processor reduces power use by the processor sufficient for the IHS to operate within the available power budget and for providing the first power output to the USB device. In additional method embodiments, the second power output provides power to the USB device within the available power budget. In additional method embodiments, throttling of the processor is avoided when the user specifies prioritizing performance of the IHS. In additional method embodiments, the prompt requests input from the user via a graphical interface of an operating system of the IHS. In additional method embodiments, an embedded controller of the IHS determines that providing the first power output to the USB device exceeds the available power budget. In additional method embodiments, the prompt specifies an estimated duration for fully charging the USB device if the user selects prioritizing use of the power budget for performance of the IHS. In additional method embodiments, the prompt specifies an estimated reduction in performance of the processor if the user selects prioritizing use of the power budget for charging the USB device.

In various additional embodiments, methods are provided for powering an Information Handling System (IHS). The methods include: powering a processor of the IHS using a power budget available to the IHS; identifying a USB device coupled to the IHS; outputting a first power output to the USB device using the power budget available to the IHS; detecting an event requiring an increase in power use by the processor; determining that providing the increase in power to the processor exceeds the power budget available to the IHS; prompting a user of the IHS to specify whether to prioritize use of the power budget for performance of the IHS or for charging the USB device; when the user specifies prioritizing charging the USB device, throttling the processor of the IHS; and when the user specifies prioritizing performance of the IHS, reducing the first power output to the USB device.

In additional method embodiments, the throttling of the processor limits power use by the processor sufficient for the IHS to remain operating within the available power budget and to provide the first power output to the USB device. In additional method embodiments, the reduced power output provides power to the USB device within the available power budget. In additional method embodiments, throttling of the processor is avoided when the user specifies prioritizing performance of the IHS. In additional method embodiments, the prompt requests input from the user via a graphical interface of an operating system of the IHS. In additional method embodiments, an embedded controller of the IHS determines that providing the increase in power to the processor exceeds the available power budget. In additional method embodiments, the prompt specifies an estimated duration for fully charging the USB device if the user selects prioritizing use of the power budget for performance of the IHS. In additional method embodiments, the prompt specifies an estimated reduction in performance of the processor if the user selects prioritizing use of the power budget for charging the USB device.

In various additional embodiments, Information Handling Systems (IHSs) may include: a processor powered using a power budget available to the IHS; a memory device coupled to the processor, the memory device storing computer-readable instructions that, upon execution by the processor, cause execution of an operating system of the IHS;

a USB port; and an embedded controller comprising a memory having program instructions stored thereon that, upon execution by a logic unit of the embedded controller, cause the embedded controller to: monitor a power demand of the processor; enable a first power output to a USB device coupled to the USB port using the power budget available to the IHS; detect an event corresponding to an increase in the power demand of the processor; determine that providing the increases power demand to the processor exceeds the power budget available to the IHS; initiate procedures for prompting a user of the IHS to specify whether to prioritize use of the power budget for performance of the IHS or for charging the USB device; when the user specifies prioritizing charging the USB device, throttle the processor; and when the user specifies prioritizing performance of the IHS, reduce the first power output to the USB device.

In additional IHS embodiments, the throttling of the processor limits power use by the processor sufficient for the IHS to remain operating within the available power budget and to provide the first power output to the USB device. In additional IHS embodiments, the reduced power output provides power to the USB device within the available power budget. In additional IHS embodiments, the prompt requests input from the user via a graphical interface of the operating system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
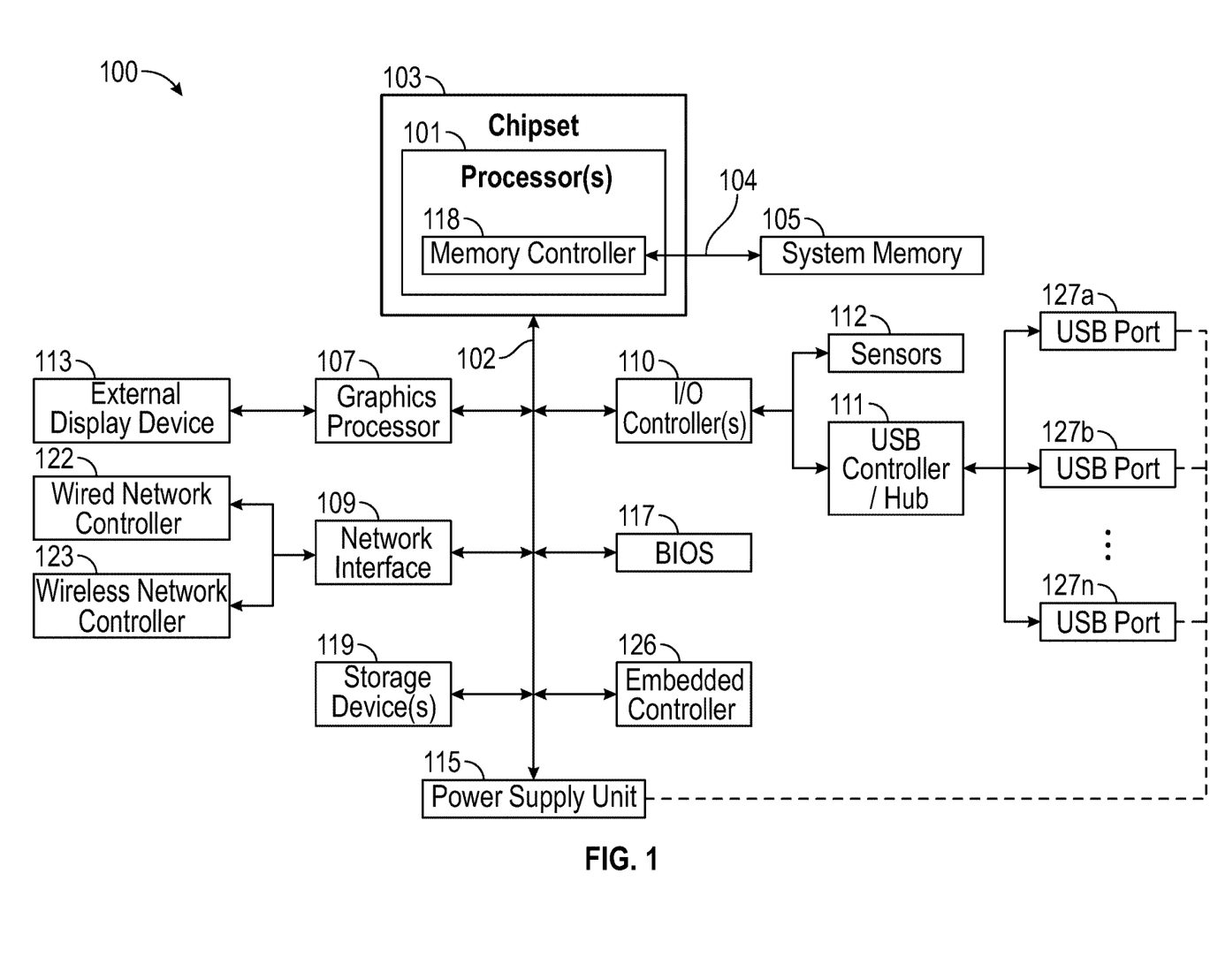
FIG. 1 is a block diagram depicting certain components of an IHS operable according to various embodiments for interactive user control of the utilization of the power available to the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device such as a desktop computer, other embodiments may be utilized.

As described above, an IHS utilizes a supply of DC power that is converted from AC power drawn from an outlet. The IHS operates within a power budget that is based on the supply of DC power that is available. As described in additional detail below, an IHS may utilize the available power budget for powering ongoing operations of the IHS, such as providing power to processors and other internal components. In addition, an IHS may serve as a power source for certain external devices that are coupled to the IHS. The Universal Serial Bus (USB) protocol enables an IHS to communicate data and transfer power with external devices that are compatible with USB standards. The USB-PD (USB Power Delivery) standard specifies protocols for bi-directional transfer of power via USB couplings. Using USB-PD couplings, an IHS may provide power to a USB device that is coupled to a USP port of the IHS, with the delivered power being used by the USB device to recharge its internal batteries. In such instances, the power that is delivered by an IHS to a coupled USB device is drawn from the available power budget of the IHS. As described below, if the available power budget of an IHS is exceeded, a throttling of the IHS's CPU may result. Embodiments provide a capability by which a user provides interactive inputs for allocating use of the available power budget so that, when the available power budget will be exceeded, the user determines whether to accept the performance impact of CPU throttling or to instead reduce the charge that is delivered to coupled USB devices.

FIG. 1 is a block diagram depicting certain components of an IHS 100 operable according to various embodiments for interactive user control of the utilization of the power available to the IHS. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs).

As described in additional detail with regard to the below embodiments, a power budget may be allocated to processor 101 from the power budget that is available to the IHS. This power budget allocated to processor 101 may be increased in order to accommodate faster processing speeds and/or increased computational loads. For instance, a user of IHS 100 may initiate use of a computationally intensive software applications, such as a simulation software program or a virtual reality program, that require significant and sustained operations by processor 101. In such scenarios, the power budget for processor 101 may be increased, as long as the increase in power is available within the power budget of the IHS. In some embodiments, the power demands of processor 101 during normal operating conditions may be referred to as a PL1 power condition and peak power demands of processor 101 may be referred to as PL2 and/or turbo power conditions. As described below, peak power demand events in processor 101 may result in the power budget of the IHS 100 being exceeded in scenarios where a portion of the power budget of IHS 100 is being utilized to provide power to a coupled USB device.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 113 coupled to the IHS 100. The one or more display devices 113 coupled to IHS 100 may utilize LCD, LED, OLED, or other display technologies. Each display device 113 may be capable of receiving touch inputs such as via a touch controller that may be an embedded component of the display device 113 or graphics processor 107, or may be a separate component of IHS 100 accessed via bus 102. In embodiments where IHS 100 is a laptop, tablet, 2-in-1 convertible device, or mobile device, display device 113 may be an integrated display device. In some embodiments, IHS 100 may be a hybrid laptop computer that includes dual integrated displays incorporated in both of the laptop panels.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. In embodiments where IHS 100 is a mobile computing device, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of processor 101. In some embodiments, more than one USB controller 111 may be utilized, with different USB controllers supporting different versions of the USB standard. USB controller 111 supports communications between IHS 100 and one or more USB devices coupled to IHS 100. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.x). In providing functions of a hub, USB controller 111 may support concurrent couplings by multiple USB devices via the USB ports 127a-n supported by IHS 100.

In addition to supporting data communications with coupled USB devices, USB ports 127a-n may support power transfers from IHS 100 to these coupled USB devices. In some embodiments, USB controller 111 may negotiate with coupled USB devices to configure power outputs from the IHS 100 to a USB device coupled to IHS 100 via a USB port 127a-n. For instance, based on negotiation with the USB device, USB controller 111 may enable a power output from power supply unit 115 to the USB ports 127a-n by which the USB device is coupled to the IHS. Such power outputs may be utilized in powering the operations of a USB device and/or recharging the internal batteries of a USB device. As described in additional detail below, providing power to a USB device in this manner can result in an error condition when the power budget of the power supply unit 115 is exceeded. In existing systems, such error conditions are avoided by automatically throttling the CPU such that the PL2 capabilities of the system are limited, thus limiting performance of the system without notifying the user of the CPU throttling or providing the user any capability for controlling how the available power budget is utilized. Accordingly, embodiments provide a capability by which a user of IHS 100 is prompted for input specifying whether the available power budget should be allocated in a manner that prioritizes powering operations of the IHS, such as maintaining the power budget of processor 101, or prioritizes providing power to a USB device that is coupled to a USB port 127a-n of the IHS.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with power supply unit 115 in managing certain aspects of the power budget of IHS 100. In some embodiments, embedded controller 126 may monitor the available power budget of power supply unit 115 and may detect scenarios where the power budget of the IHS 100 of will be exceeded due to power outputs to a coupled USB device or due to a high-power processor event. In some embodiments, embedded controller 126 may interface with the power supply unit 115 in order to determine the total power budget that is available to the IHS 100. For instance, embedded controller 126 may interrogate a power supply unit for PSID (Power Supply Identifier) information that specifies the power outputs that are supported. As described in additional detail below, in some embodiments, embedded controller 126 may interface with the operating system of IHS 100 in order to solicit interactive input from the user regarding the preferred allocation of the available power budget between IHS operations and providing charge to a coupled USB device. The operating system input from the user may be reported to the embedded controller 126 where the user input may be used in configuring the allocation of available power by the power supply unit 115.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figures 2A, 2B:
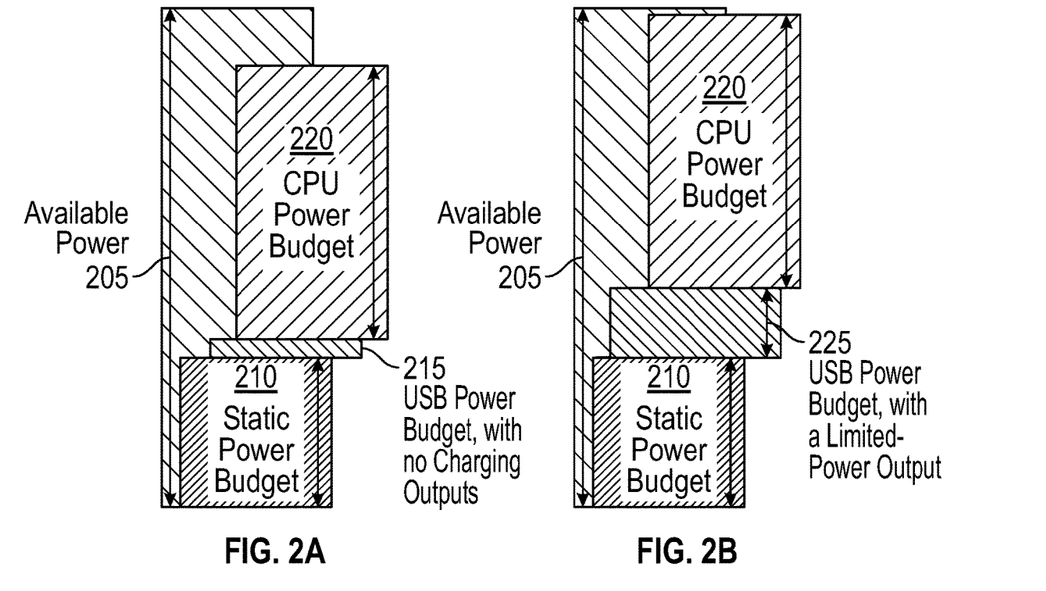
FIG. 2A is a diagram depicting an allocation of a power budget by an IHS, where no portion of the power budget is utilized in providing power to an externa USB device.
FIG. 2B is a diagram depicting an allocation of a power budget by an IHS with limited charging of an external USB device.

FIG. 2A is a diagram depicting an allocation of a power budget by an IHS, where no portion of the power budget is utilized in providing power to an external USB device. As described, an IHS may operate from an available power budget 205 that is allocated by a power supply unit. As indicated in FIG. 2A, the available power budget 205 of an IHS may be allocated between static and variable power demands of the IHS. For instance, a portion of the available power budget 205 may be allocated to a static power budget 210 that is used to support certain core operations, such as powering the motherboard of the IHS, supporting storage device operations, and powering certain peripheral devices, such as cooling fans and user input devices necessary for operating the IHS.

The variable portion of the power budget of an IHS may include a CPU power budget 220. As described, a processor of an IHS may consume variable amounts of power depending on the operations being performed by the processor. For instance, a processor may consume significantly less power when an IHS is being employed for editing a text document in comparison to the power consumed by a processor when the IHS is being utilized for a gaming or virtual reality applications. Accordingly, the size of the CPU power budget 220 may change in response to ongoing use of the IHS. As illustrated in FIG. 2A, the variable portion of the IHS power budget may also include a USB power budget 215. In the scenario illustrated in FIG. 2A, the USB power budget 215 provides sufficient power for supporting USB data operations, such as streaming audio from a coupled USB device, without any USB power transfers from the IHS 100 to the coupled USB device. Since the USB power budget 215 is only supporting data operations, the size of the USB power budget 215 is relatively small compared to the static power budget 210 and the CPU power budget 220. As such, the IHS is able to satisfy the static power budget 210, the USB power budget 215, and the CPU power budget 220 without exceeding the total power budget 205 that is available to the IHS.

FIG. 2B is a diagram depicting allocation of a power budget by an IHS, where a limited portion of the power budget is utilized in providing power to an external USB device. In the scenario illustrated in FIG. 2B, the USB power budget 225 has increased to support a limited-power charging output to an external USB device. As illustrated, the static power budget 210 and the CPU power budget 220 remain unchanged from the scenario illustrated in FIG. 2A. Although supporting the USB charging output results in a significant increase to the USB power budget 225, the operations of the IHS nonetheless remains within the available power budget 205.

Figures 2C, 2D:
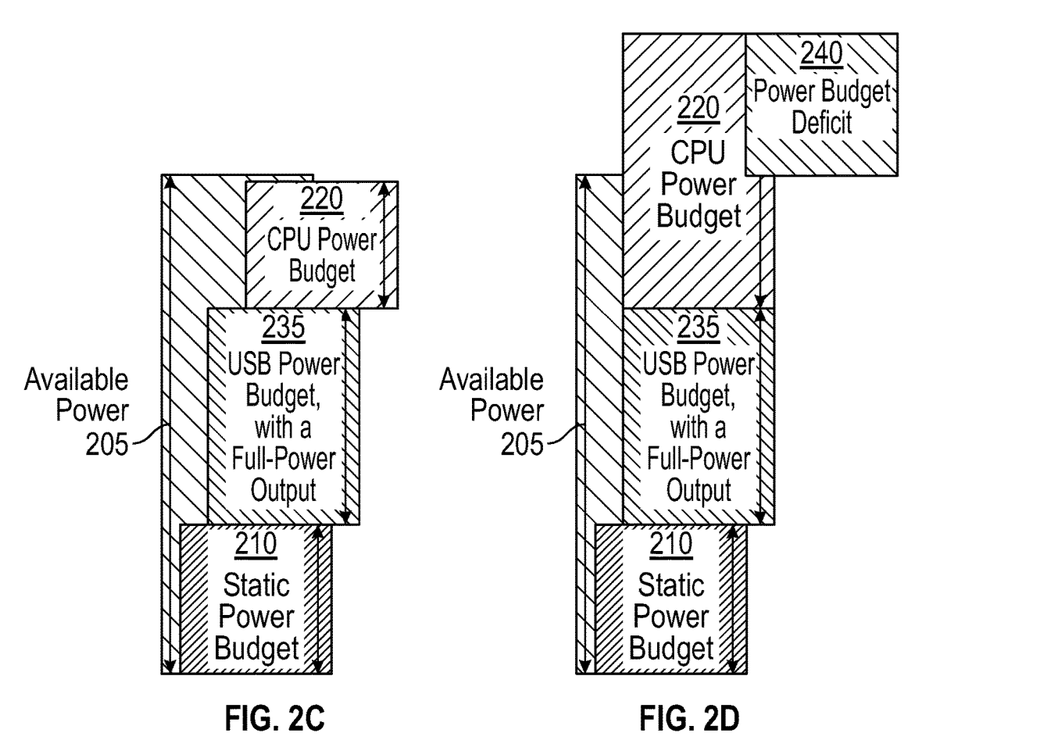
FIG. 2C is a diagram depicting an allocation of a power budget by an IHS with full charging of an external USB device and a throttled CPU power budget.
FIG. 2D is a diagram depicting an error condition resulting from the power budget of an IHS being exceeded when simultaneously supporting both high-power charging of an external USB device and a high-power processor event.

FIG. 2C is a diagram depicting allocation of a power budget by an IHS, where a larger portion of the power budget is utilized in providing power to an external USB device. As described, the power consumption of a processor may be variable and may depend on various factors. In the scenario illustrated in FIG. 2C, the CPU power budget 230 has decreased from the CPU power budget 220 of FIG. 2B. Such a decrease in a CPU power budget 230 may result, for example, from the user terminating use of a computationally intensive software program. As illustrated, the USB power budget 235 has increased further, now supporting a full-power charging output to an external USB device. Due to the decrease in the CPU power budget 230, the increased USB power budget 235 may be accommodated while the IHS remains operating within the available power budget 205. In this scenario, peak CPU performance is compromised by limiting the available PL2 current or turbo power of the IHS.

FIG. 2D is a diagram depicting a potential error condition resulting from the power budget of an IHS being exceeded when attempting to simultaneously support providing power for both high-power charging of an external USB device and for a high-power processor event. As described, the CPU power budget 230 of FIG. 2C reflects a decrease in the CPU power budget 220 of FIG. 2B, where the reduction in the CPU power budget may result, for example, from the user terminating use of a software program that requires significant processing resources. In the scenario of FIG. 2D, the user may have resumed use of such a computationally intensive software program, even though the IHS is still providing a power output to a USB device. As illustrated, the static power budget 210 and the USB power budget 235 that is supporting a full-power output to a USB device remain unchanged from the scenario of FIG. 2C. However, as illustrated, the CPU power budget 220 has increased and returned to the CPU power budget in use in the scenarios of FIGS. 2A, 2B. As illustrated, supporting this increase in the CPU power budget 220 results in the available power budget 205 of the IHS being exceeded. The power deficit 240 that exceeds the available power budget 205 may result in CPU throttling, thus limiting the performance capabilities of the IHS. Embodiments notify the user of detected power budget conflicts and provide the user a capability for specifying how to resolve individual power budget conflicts. Using this capability provided by embodiments, a user may be provided an option to resolve a detected power budget conflict by limiting USB charging, such that CPU performance is not compromised, or to accept throttled CPU capabilities in order to maximize USB charging.

Figure 3:
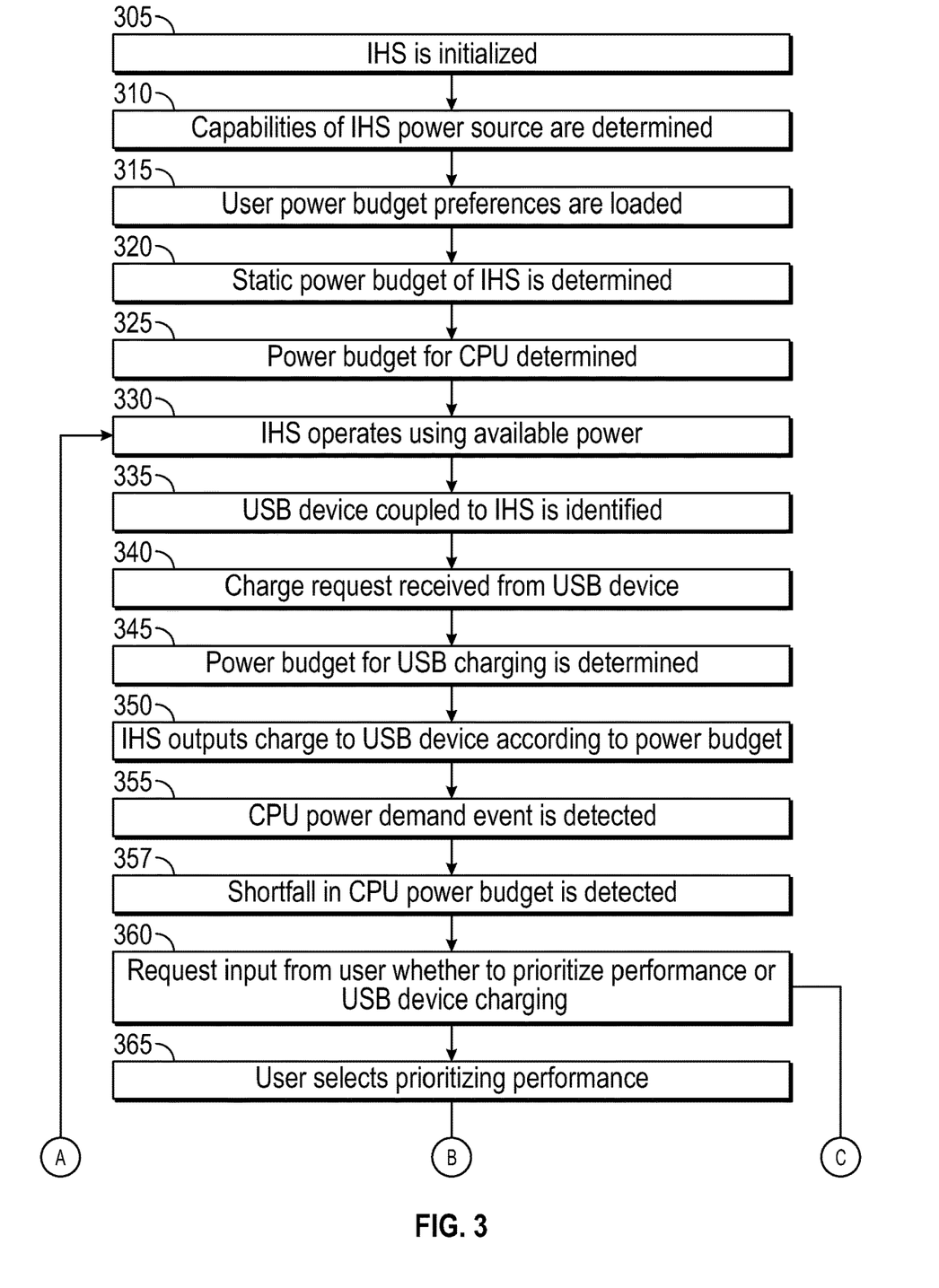
FIG. 3 is a flow chart diagram illustrating certain steps of a process according to various embodiments for interactive user control of the utilization of the power available to the IHS.

FIG. 3 is a flow chart diagram illustrating certain steps of a process according to various embodiments for interactive user control of the utilization of the power available to the IHS. Utilizing the embodiment of FIG. 3, scenarios such as illustrated in FIG. 2D may be detected and the user of the IHS may be prompted for input regarding how the conflict in power budgets should be handled by the IHS. Embodiments may begin at block 305 with the initialization of the IHS. Upon being initialized, at block 310, the power supply capabilities of the IHS may be determined. In some embodiments, an embedded controller of the IHS, such as embedded controller 126 of FIG. 1, may interface with the power supply unit of the IHS in order to determine its power supply capabilities, such as based on PSID information provided by the power supply unit. At block 315, the power budget preferences that have been set by the user are loaded. Such preferences may specify settings such as power budget deficit thresholds that trigger requesting user input for resolving the conflict and default behavior to be used when the user does not respond to a request for input.

At block 320, the static power budget of the IHS is determined. As described, the power budget of an IHS may include a static portion that is dedicated to supporting core operations of the IHS and may also include variable portion that may increase and decrease depending on how the IHS is utilized. In some embodiments, information describing the static power budget may be maintained by the power supply unit of the IHS. At block 325, the current power budget for the CPU of the IHS is determined. In some embodiments, the embedded controller of the IHS may interface with the CPU, such as via PECI (Platform Environmental Control Interface) communications, in order to ascertain the current power budget that has been allocated for use by the CPU. At block 330, the IHS operates utilizing the static power budget and with the processor of the IHS utilizing the allocated CPU power budget. While operating in this manner, the CPU power budget may be adjusted to account for changes in the computational load placed on processor.

With the IHS operating in this manner, at block 335, a USB device that is coupled to the IHS is identified. In some scenarios, the IHS may operate for considerable time before a USB device is coupled to the IHS. In other scenarios, the USB device may be coupled to the IHS prior to its initialization. In either case, a USB controller or similar capability of the IHS detects and identifies a device that has been coupled to a USB port of the IHS. At block 340, a power request is received from the USB device. The USB controller or similar capability of the IHS may monitor for USB-PD communications from a USB device, where these communications may indicate requests for delivery of power from the IHS to the USB device. Such delivery requests may specify a request for delivery of power at one of several power levels, such as 5 W, 7.5 W, 10 W or 15 W, that are supported by the USB-PD protocols. The different power levels that may be negotiated result in charging of the batteries of coupled USB devices at different rates, with the delivery of greater power levels typically resulting in faster charging of these batteries.

In response to such power delivery request, at block 345, an updated power budget is determined for the IHS. In some embodiments, such power budget calculations may be implemented by an embedded controller, such as embedded controller 126 of FIG. 1, that interfaces with the power supply unit to determine the static power budget and interfaces with the processor to determine its CPU power budget. Upon reporting the power delivery request to the embedded controller, the available USB power budget is determined. As illustrated in FIGS. 2B and 2C, the size of the USB power budget may depend on the size of the current CPU power budget. In some scenarios, the IHS may be able to supply a requested power delivery output to the USB device while also maintaining the CPU power budget and also remaining within the overall power budget that is available to the IHS. In other scenarios, remaining within the overall power budget may require supplying the USB device with a lower power output than was requested by the USB device, where this lower power output may be negotiated with the USB device by the USB controller. At block 350, the IHS provides a power supply output to the USB device, where this output is provided within the available power budget of the IHS.

As described, the CPU power budget of an IHS is variable and may change depending on operations of the IHS. For instance, the processing load on a CPU may increase significantly in response to the user initiating use of certain software programs or initiating certain computationally intensive operations within such programs, such as the user opening a complex rendering within a 3-D design program or starting a new virtual reality session. In other instances, a CPU processing load may increase in response to operations by background processes of the IHS operating system, such as by a disk defragmentation process. At block 355, such CPU power demand events are detected. In some embodiments, such events may be detected by an embedded controller that queries power status settings of the processor, where such status messages indicate a level of power demand by the processor. Upon conducting such queries to determine the CPU power budget, at block 357, a conflict in the allocation of the IHS power budget is detected. In some embodiments, an embedded controller may implement operations for continuously monitoring the use of the available power budget and may thus monitor for requests for additional power, such as power demand events by the processor or a request for power from a coupled USB device. Based on such monitoring, the embedded controller may detect scenarios where the available power budget will be exceeded if the current power requests are all honored.

Upon detecting a power deficit that would result from a requested increase in the variable power budget, at block 360, the user is prompted for input regarding whether to prioritize performance of the IHS or charging of the USB device, where this input is utilized in determining how to allocate the available power budget of the IHS. In some embodiments, the user may be prompted for such inputs via a graphical interface of the operating system. For instance, the operating system may display a dialog window that prompts the user to specify a preference for utilizing available power. In some instances, the dialog window may be a pop-up dialog, such as a toolbar dialog window, that prompts the user to specify power utilization preferences. In some embodiments, the user may be blocked from further use of the operating system until specifying a preference for utilizing available power.

In some embodiments, the presented graphical interface may include information informing the user of estimated consequences for each provided option. For instance, the presented option for prioritizing performance of IHS may inform the user that by selecting prioritization of performance, completing charging of the USB device may be delayed. In some embodiments, the embedded controller of the IHS may interface with the USB device in order to determine an estimated duration required to charge the USB device at various output levels supported by the IHS. In such embodiments, the presented option for prioritizing performance may provide the user with an estimate of the time required to complete charging the USB device, if the user chooses to select this option. Similarly, the presented option for prioritizing USB charging may inform the user that by selecting prioritization of charging, processing capabilities of the IHS may be attenuated. In some embodiments, the embedded controller may estimate the amount of CPU throttling that would be required to continue operating using the existing USB power budget. In such embodiments, the presented option for prioritizing USB charging may provide the user with an estimate of the percentage of CPU processing capabilities that will be available, or unavailable, until charging of the USB device is complete. In some embodiments, the user may be additionally provided with an estimate of the time required to complete charging of the USB device while the CPU processing capabilities remain limited.

At block 365, the user selects the user interface option for prioritizing performance of the IHS in use of the available power budget. As described, this selection results in prioritization of the CPU power budget over the USB power budget. Accordingly, at block 370, the power being output to the USB device is reduced and the CPU power budget is allocated to provide sufficient power for supporting the power demand event detected at block 355. In such a scenario, the power budget of the IHS may be allocated as illustrated in FIG. 2B, where the USB power budget is limited and the CPU power budget may be increased to the fullest extent allowed within the available power budget. The power budget allocation may continue in use until charging of the USB device is complete, at block 385.

At block 375, the user selects the user interface option for prioritizing USB charging in use of the available power budget. As described, this selection results in prioritization of the USB power budget over the CPU power budget. Accordingly, at block 380, the CPU of the IHS is throttled in a manner that limits the use of power by the CPU. In some embodiments, such CPU throttling is implemented through configuration of power level settings supported by a processor, such as via PECI messaging. Based on such throttling, the power required for the power demand event of block 355 is not allocated. In such a scenario, the power budget of the IHS may be allocated as illustrated in FIG. 2C, where the CPU power budget is limited and the existing USB power budget is maintained, thus maintaining power use within the available charging budget. The power budget allocation may continue in this manner until charging of the USB device is complete, at block 385, after which throttling of the CPU is discontinued.

In the scenario illustrated in FIG. 3, while an IHS outputs power to a coupled USB device, embodiments trigger a request for user input based on detecting a power demand event that would result in the power budget of the IHS being exceeded. In scenarios where an IHS is operating according to a CPU power budget and no power is being output to a coupled USB device, embodiments may also trigger a request for user input based on detecting a request for power from a coupled USB device. In such scenarios, the request for input may notify the user that selecting prioritization of USB device charging may result in degraded performance in one or more software applications currently in use. In some embodiments, the request for input may specify specific software applications that may be adversely affected by prioritizing use of power for USB device charging. The request for input may also notify the user that selecting prioritization of performance will result in a slower rate of charging the USB device that has been coupled to the IHS, where the notification may also provide an estimate of the time required to complete charging of the USB device if the user selects prioritization of performance.

Whether triggered based on detection of a CPU power demand event that will result in the power budget being exceeded or based on detection of a request for power from a coupled USB device, the input provided by the user may be utilized to avoid error conditions resulting from exceeding the power budget. Existing power budget settings allow users to specify general preferences for use of available power for maximizing performance or for other tasks, such as charging external USB devices. However, such existing power budget settings are specified via BIOS configurations that are applied uniformly in every scenario, without providing opportunity for a user to specify preferences for use in individual instances of power budget conflicts. Rather than utilize such static user preferences in all instances, embodiments provide a mechanism by which users may specify preferences for allocation of power that suit a specific context. For instance, in some situations, a user trying to quickly charge a USB device may be willing to sacrifice significant amounts of performance in order to complete charging of the device. However, when trying to charge that same USB device at another time, the user may have no time constraints in completing this charging and may instead prefer to prioritize IHS performance in the use of the available power budget.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for powering an Information Handling System (IHS), the method comprising:
   powering a processor of the IHS using a power budget available to the IHS;
   identifying a USB device coupled to the IHS;
   receiving a request for a first power output by the IHS to the USB device;
   determining that providing the first power output to the USB device exceeds the power budget available to the IHS;
   prompting a user of the IHS to specify whether to prioritize use of the power budget for performance of the IHS or for charging the USB device, wherein the prompt specifies an estimated reduction in performance of the processor if the user selects prioritizing use of the power budget for charging the USB device;
   when the user specifies prioritizing charging the USB device, throttling the processor of the IHS; and
   when the user specifies prioritizing performance of the IHS, providing a second power output to the USB device, wherein the second power output is less than the first power output.

2. The method of claim 1, wherein the throttling of the processor reduces power use by the processor sufficient for the IHS to operate within the available power budget and for providing the first power output to the USB device.

3. The method of claim 1, wherein the second power output provides power to the USB device within the available power budget.

4. The method of claim 1, wherein throttling of the processor is avoided when the user specifies prioritizing performance of the IHS.

5. The method of claim 1, wherein the prompt requests input from the user via a graphical interface of an operating system of the IHS.

6. The method of claim 1, wherein an embedded controller of the IHS determines that providing the first power output to the USB device exceeds the available power budget.

7. The method of claim 1, wherein the prompt specifies an estimated duration for fully charging the USB device if the user selects prioritizing use of the power budget for performance of the IHS.

8. A method for powering an Information Handling System (IHS), the method comprising:
   powering a processor of the IHS using a power budget available to the IHS;
   identifying a USB device coupled to the IHS;
   outputting a first power output to the USB device using the power budget available to the IHS;

detecting an event requiring an increase in power use by the processor;

determining that providing the increase in power to the processor exceeds the power budget available to the IHS;

prompting a user of the IHS to specify whether to prioritize use of the power budget for performance of the IHS or for charging the USB device, wherein the prompt specifies an estimated reduction in performance of the processor if the user selects prioritizing use of the power budget for charging the USB device;

when the user specifies prioritizing charging the USB device, throttling the processor of the IHS; and when the user specifies prioritizing performance of the IHS, reducing the first power output to the USB device.

9. The method of claim 8, wherein the throttling of the processor limits power use by the processor sufficient for the IHS to remain operating within the available power budget and to provide the first power output to the USB device.

10. The method of claim 8, wherein the reduced power output provides power to the USB device within the available power budget.

11. The method of claim 8, wherein throttling of the processor is avoided when the user specifies prioritizing performance of the IHS.

12. The method of claim 8, wherein the prompt requests input from the user via a graphical interface of an operating system of the IHS.

13. The method of claim 8, wherein an embedded controller of the IHS determines that providing the increase in power to the processor exceeds the available power budget.

14. The method of claim 8, wherein the prompt specifies an estimated duration for fully charging the USB device if the user selects prioritizing use of the power budget for performance of the IHS.

15. An Information Handling System (IHS) comprising:
a processor powered using a power budget available to the IHS;
a memory device coupled to the processor, the memory device storing computer-readable instructions that, upon execution by the processor, cause execution of an operating system of the IHS;
a USB port; and
an embedded controller comprising a memory having program instructions stored thereon that, upon execution by a logic unit of the embedded controller, cause the embedded controller to:
monitor a power demand of the processor;
enable a first power output to a USB device coupled to the USB port using the power budget available to the IHS;
detect an event corresponding to an increase in the power demand of the processor;
determine that providing the increases power demand to the processor exceeds the power budget available to the IHS;
initiate procedures for prompting a user of the IHS to specify whether to prioritize use of the power budget for performance of the IHS or for charging the USB device, wherein the prompt specifies an estimated reduction in performance of the processor if the user selects prioritizing use of the power budget for charging the USB device;
when the user specifies prioritizing charging the USB device, throttle the processor; and
when the user specifies prioritizing performance of the IHS, reduce the first power output to the USB device.

16. The IHS of claim 15, wherein the throttling of the processor limits power use by the processor sufficient for the IHS to remain operating within the available power budget and to provide the first power output to the USB device.

17. The IHS of claim 15, wherein the reduced power output provides power to the USB device within the available power budget.

18. The IHS of claim 15, wherein the prompt requests input from the user via a graphical interface of the operating system.

* * * * *